(12) United States Patent
Inagaki et al.

(10) Patent No.: US 9,184,429 B2
(45) Date of Patent: Nov. 10, 2015

(54) MICROPOROUS MEMBRANE WINDING AND METHOD FOR MANUFACTURING THE SAME

(75) Inventors: Daisuke Inagaki, Tokyo (JP); Hisashi Takeda, Tokyo (JP); Shintaro Inaba, Tokyo (JP)

(73) Assignee: ASAHI KASEI E-MATERIALS CORPORATION, Tokyo (JP)

( * ) Notice: Subject to any disclaimer, the term of this patent is extended or adjusted under 35 U.S.C. 154(b) by 0 days.

(21) Appl. No.: 13/123,846

(22) PCT Filed: Aug. 25, 2010

(86) PCT No.: PCT/JP2010/064359
§ 371 (c)(1),
(2), (4) Date: Jul. 25, 2011

(87) PCT Pub. No.: WO2011/024849
PCT Pub. Date: Mar. 3, 2011

(65) Prior Publication Data
US 2012/0164538 A1    Jun. 28, 2012

(30) Foreign Application Priority Data
Aug. 25, 2009    (JP) .................. 2009-194445

(51) Int. Cl.
*H01M 2/16*    (2006.01)
*H01G 11/52*    (2013.01)
*H01M 2/18*    (2006.01)
(Continued)

(52) U.S. Cl.
CPC ............ *H01M 2/1653* (2013.01); *H01G 11/52* (2013.01); *H01M 2/18* (2013.01); *H01M 2/145* (2013.01); *H01M 2/166* (2013.01); *H01M 2/1686* (2013.01); *H01M 10/0525* (2013.01); *Y02E 60/13* (2013.01)

(58) Field of Classification Search
CPC .............................. H01M 2/18; H01M 2/1653
USPC ................................... 429/249; 242/159, 520
See application file for complete search history.

(56) References Cited

U.S. PATENT DOCUMENTS 5,868,933 A * 2/1999 Patrick et al. ................. 210/484
2003/0031924 A1 2/2003 Lee et al.
(Continued)

FOREIGN PATENT DOCUMENTS

CN    1362892 A    8/2002
CN    101501891 A    8/2009
(Continued)

OTHER PUBLICATIONS

International Preliminary Report on Patentability dated Mar. 22, 2012 issued in International Application No. PCT/JP2010/064359.
(Continued)

*Primary Examiner* — Gary Harris
(74) *Attorney, Agent, or Firm* — Finnegan, Henderson, Farabow, Garrett & Dunner, L.L.P.

(57) ABSTRACT

A microporous membrane winding includes a microporous membrane wound around a core. The core has an outer diameter of 5 inches or greater, and has an outer surface with a surface roughness of 3.0 μm or less. A microporous membrane that is excellent in thickness uniformity and is favorably used as a separator for a lithium-ion secondary battery can be obtained from the microporous membrane winding.

24 Claims, 1 Drawing Sheet

(51) Int. Cl.
*H01M 2/14* (2006.01)
*H01M 10/0525* (2010.01)

(56) References Cited

U.S. PATENT DOCUMENTS

| | | | |
|---|---|---|---|
| 2004/0069885 A1* | 4/2004 | Kobayashi et al. | 242/160.4 |
| 2007/0018141 A1* | 1/2007 | Kepler et al. | 252/500 |
| 2009/0092893 A1* | 4/2009 | Takita et al. | 429/145 |

FOREIGN PATENT DOCUMENTS

| | | |
|---|---|---|
| EP | 1 153 967 A1 | 11/2001 |
| EP | 1 162 227 A1 | 12/2001 |
| JP | 08-039688 | 2/1996 |
| JP | 09-272148 | 10/1997 |
| JP | 10-340715 | 12/1998 |
| JP | 2009-91461 | 4/2009 |
| JP | 2009091461 A * | 4/2009 |
| JP | 2009-270013 | 11/2009 |
| WO | WO 2008/013114 A1 | 1/2008 |
| WO | WO 2010/073707 A1 | 7/2010 |

OTHER PUBLICATIONS

English-Language Translation of Japanese Search Report for International Application No. PCT/JP2010/064359, mailing dated Dec. 7, 2010.

Physical Properties of Selected Polymers, In: W.M. Haynes, ed.: CRC Handbook of Chemistry and Physics, $93^{rd}$ Ed. (Internet Version 2013), Mar. 31, 2012, (XP002686843) pp. 13-3-13-4.

Extended European Search Report for EP Application No. 10811898.5 mailed Jul. 23, 2013.

Office Action for Chinese Patent Application No. 201080035055.6 dated Nov. 5, 2013.

"Experimental Electrochemistry", Nuli Yanna, et al., Chemical Industry Press.

* cited by examiner

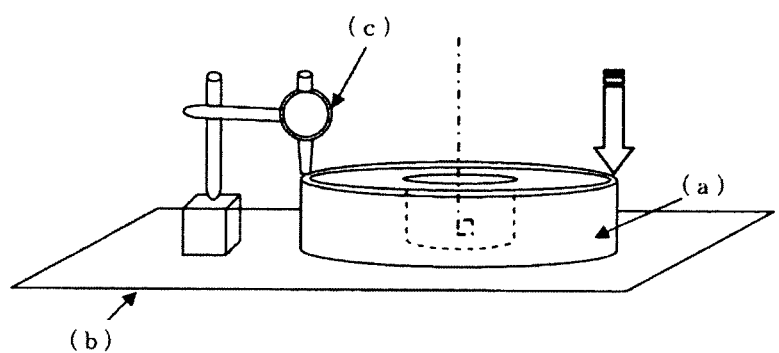

MICROPOROUS MEMBRANE WINDING AND METHOD FOR MANUFACTURING THE SAME

TECHNICAL FIELD

The present invention relates to a microporous membrane winding favorably used for a lithium-ion secondary battery and a lithium-ion secondary battery using a microporous membrane obtained (unwound) from the microporous membrane winding, and relates to a method for manufacturing the same.

BACKGROUND ART

Microporous membranes are widely used as membranes for separation or permselective separation of various substances and as materials for isolation of various substances. Examples of the use of the membranes may include microfiltration membranes, fuel cell separators, capacitor separators, base materials for functional membranes to allow a novel function to develop by filling pores with a functional material, and battery separators. Above all, microporous polyolefin membranes are preferable as separators for lithium-ion batteries widely used in laptop personal computers, cell phones, and digital cameras, for example.

For instance, Patent Document 1 discloses a microporous membrane with a small surface roughness. Patent Document 2 discloses a polyester film wound around a core with a small surface roughness. Patent Document 3 discloses a technique enabling a film property to be maintained during winding while preventing misalignment during winding by improving the mechanical strength and the elastic modulus of a wound film.

PRIOR ART DOCUMENTS

Patent Documents

Patent Document 1: JP2009-91461 A
Patent Document 2: JP09-272148 A
Patent Document 3: JP10-340715 A

SUMMARY OF THE INVENTION

Problem to be Solved by the Invention

In recent years, as batteries have higher capacity, membranes as separators used in the batteries especially have been made thinner and have been required to have more uniform membrane thickness. In general, as separators for high-capacity lithium-ion secondary batteries, a thin membrane is used because electrode can be used as much as possible.

Conventional separators, however, still have room for improvement in the uniformity of membrane thickness.

It is an object of the present invention to provide a microporous membrane winding providing a microporous membrane that is preferable as a separator for a lithium-ion secondary battery and has excellent thickness uniformity in especially MD (machine direction of an extruder when a microporous membrane is formed that is in parallel with a resin discharging direction).

Means for Solving the Problem

In order to improve the thickness uniformity of a microporous membrane, the present inventors have found that attention needs to be paid to a shape, properties (shape of the core surface, thermal expansion coefficient, swelling rate due to humidity) and a quality of a core around which a microporous membrane is wound.

More specifically, when a microporous membrane is wound around a core, a phenomenon called "constriction due to winding" occurs to the membrane because it contains micropores. Then, the constriction due to winding will cause transferring the surface shape of the core onto the microporous membrane, leading to tendency of generating deformation in the microporous membrane.

Such deformation propagated over the entire winding may lead to significant thickness nonuniformity especially in the comparison between a portion of the microporous membrane located inside the winding and a portion located outside, thus may degrade the quality of a battery. Such tendency becomes more serious with decrease in membrane thickness or increase in winding-around length (this may be described as "winding length").

When a core of a microporous membrane winding swells or shrinks due to a change in temperature or humidity during transportation, for example, the above deformation of the microporous membrane tends to grow.

Further, when a core is attached to an individual or a coaxial-armed reeler or winder, a side face of the core is pressed against an alignment face of such as a winding arm or a wall surface of the winder to set an attachment position of the core. As a result of extensive investigation, the present inventors have found that an installation angle to the alignment face does not become constant because of a difference in force to press the core against the alignment face in fixing the core, and so a microporous membrane is wound around the core while the core being fixed on a slight tilt, which leads to the appearance of winding misalignment or wrinkles in unwinding of the microporous membrane with a battery winder.

As a result of extensive investigation to achieve the above-stated object, the present inventors have found that the above-stated problems can be solved by winding a microporous membrane around a core with a specific outer diameter and a specific surface roughness, thus accomplishing the present invention.

The present inventors further have found that when a root mean square value roughness and an average length of curvilinear elements on an outer surface of a core, a thermal expansion coefficient and a swelling rate of the core, backlash and a relationship between the number of laminations of the winding and the winding length of a microporous membrane are within a specific range, the thickness uniformity of the microporous membrane unwound from the microporous membrane winding can be further improved.

That is, one aspect of the present invention is as follows:
a microporous membrane winding includes a core and a microporous membrane wound around the core, the core has an outer diameter of 5 inches or greater, and has an outer surface with a surface roughness of 3.0 µm or less.

Another aspect of the present invention is as follows:
a method for manufacturing a microporous membrane winding, includes the steps of:
preparing a core with an outer diameter of 5 inches or greater and with an outer surface having a surface roughness of 3.0 µm or less;
preparing a microporous membrane; and
winding the microporous membrane around the core.

Effect of the Invention

According to the present invention, a microporous membrane winding can be achieved, that is capable of providing a microporous membrane with favorable uniformity in thickness distribution (membrane thickness uniformity).

BRIEF DESCRIPTION OF THE DRAWINGS

FIG. 1 schematically illustrates an apparatus to measure a maximum backlash.

MODE FOR CARRYING OUT THE INVENTION

The following describes best mode for carrying out the present invention (hereinafter abbreviated as "present embodiment") in detail. The present invention is not limited to the embodiments below, and can be embodied in various manners within the scope of the gist of the invention.

A microporous membrane winding of the present embodiment is a microporous membrane winding obtained by winding a microporous membrane around a core, wherein the core has an outer diameter of 5 inches or greater, and an outer surface of the core has a surface roughness of 3.0 µm or less. Such a configuration allows a microporous membrane obtained from the microporous membrane winding in the present embodiment to have favorable membrane thickness uniformity as required especially for a high-capacity lithium-ion secondary battery.

In the present embodiment, "1 inch" can be converted into 25.4 mm.

Herein, a "winding" refers to a microporous membrane with a uniform width and a predetermined length that is wound around a core. The winding length and the width are not limited especially, and typically the width is in the range of from 50 m to 10,000 m, and the width is in the range of from a few mm to 1,000 mm. When the microporous membrane is used as a separator for a lithium-ion secondary battery, the winding length is typically in the range of from 500 m to 5,000 m, and the width is typically in the range of from 20 mm to 500 mm.

The "core" refers to a winding core having a circular cylindrical shape in outline, including a paper core and a cylindrical winding core made of ABS resin or phenol resin, used for winding of a microporous membrane. In order to reduce the constriction of the wound microporous membrane due to winding, such a core has an outer diameter of 5 inches or greater, preferably of 6 inches or greater, more preferably of 8 inches or greater, and still more preferably of 9 inches or greater. The upper limit of the outer diameter of the core, but not limited to, is preferably of 20 inches or less and more preferably of 15 inches or less from the standpoint of handling.

The width (length) of the core is typically in the range of from a few mm to 1,000 mm. However, since the effects of the present invention is beneficial for a wider core, the width preferably is 10 mm or greater and 1,000 mm or less, more preferably 50 mm or greater and 1,000 mm or less, and particularly preferably 100 mm or greater and 1,000 mm or less. This is because a wider winding is susceptible to quality of its core.

The "surface roughness" refers to a so-called Ra (arithmetic average roughness).

The surface roughness Ra of the outer surface of the core is 3.0 µm or less, preferably is 2.0 µm or less, more preferably is 1.0 µm or less, still more preferably is 0.8 µm or less, particularly preferably is 0.5 µm or less, and most preferably is 0.3 µm or less. The surface roughness of the outer surface of 3.0 µm or less can reduce the transferring of unevenness of the core onto the microporous membrane near the innermost layer when the microporous membrane is wound tightly.

Thereby, the membrane thickness uniformity of the microporous membrane between the innermost layer and the outer layer of the winding can be improved even when the microporous membrane is thin. The improved membrane thickness uniformity can reduce variation in battery capacity.

The lower limit of the surface roughness, but no limited to, is preferably 0.01 µm or greater, more preferably is 0.05 µm or greater, and still more preferably is 0.1 µm or greater.

Similarly to Ra, the root mean square value roughness Rq of the outer surface of the core also preferably is 3.0 µm or less, more preferably is 2.0 µm or less, still more preferably is 1.0 µm or less, still more preferably is 0.8 µm or less, particularly preferably is 0.5 µm or less, and most preferably is 0.3 µm or less. Rq of the outer surface of 3.0 µm or less can reduce the transferring of unevenness of the core onto the microporous membrane near the innermost layer when the microporous membrane is wound tightly. Thereby, the membrane thickness uniformity of the microporous membrane between the innermost layer and the outer layer of the winding can be improved even when the microporous membrane is thin. The improved membrane thickness uniformity can reduce variation in battery capacity.

The lower limit of Rq, but no limited to, is preferably 0.01 µm or greater, more preferably is 0.05 µm or greater, and still more preferably is 0.1 µm or greater.

The average length Sm of the curvilinear elements on the outer surface of the core preferably is 300 µm or less, more preferably is 200 µm or less and still more preferably is 100 µm or less. The Sm of 300 µm or less leads to improved membrane thickness uniformity of the microporous membrane for the same reason as in Ra and Rq. The lower limit of Sm, but no limited to, is preferably 0.1 µm or greater and more preferably is 1 µm or greater.

A method for obtaining Ra, Rq and Sm in the above-stated ranges is not limited especially, and Ra, Rq and Sm can be made desired values by cutting, polishing or grinding the outer surface of the core precisely, or by brining the outer surface of the core into contact with a heated mirror-finished roll.

When the core is made of paper, for example, a resin layer is applied on the outer surface of the core, and the resin layer is cut, polished or ground, or is brought into contact with a heated mirror-finished roll, whereby a desired surface roughness can be obtained.

The "outer surface" refers to a portion of the surface around which the microporous membrane is wound, and a portion of the surface of the core with which the microporous membrane does not contact is not limited especially.

Since the effects of the present embodiment can be obtained even when a portion with the above-mentioned surface roughness exists partially, a ratio of the region having the above-mentioned surface roughness to the outer surface is not limited especially. The ratio of the region having a surface roughness of 3.0 µm or less to the entire outer surface (a portion of the core surface that is brought into contact with the microporous membrane) is preferably 80% or greater, more preferably 90% or greater, and still more preferably 100%.

An average of the surface roughness of the overall length of the core in the width direction is preferably 3.0 µm or less.

A preferred material of the core, but not limited to, includes plastic and a thermosetting resin etc, because they have a small thermal expansion coefficient, improved stiffness, a small swelling rate for humidity, and excellent winding property. Note that when the core is made of paper, its surface may be coated with a resin etc, whereby a desired property can be easily obtained.

An absolute value of the thermal expansion coefficient is preferably $150 \times 10^{-6}$/K or less, more preferably $100 \times 10^{-6}$/K or less, and particularly preferably $50 \times 10^{-6}$/K or less. For example, in transporting the microporous membrane winding for a long time, if the absolute value of the thermal expansion coefficient is $150 \times 10^{-6}$/K or less, the tendency of the core to swell or shrink under the influence of ambient temperatures is reduced, thus the microporous membrane is not subjected to a pressure and its quality can be maintained. As a result, variations in battery capacity also can be reduced effectively.

The swelling rate for humidity can be evaluated based on a value (swelling rate) that is calculated from the outer diameter when the core is left to stand for 24 hours at the temperature of 25° C. and the relative humidity of 50% and under humidification of 100%. The swelling rate is preferably 0.06% or less, more preferably 0.04% or less and particularly preferably 0.02% or less. Such a core can be obtained by selecting a material appropriately or optimizing an aging condition. A material suitable for manufacturing a core with a low swelling rate for humidity includes polytetrafluoroethylene, polyethylene, ABS with reduced polar groups and heat-treated Bakelite etc.

For example, in transporting the microporous membrane winding for a long time, if the swelling rate is 0.06% or less, the tendency of the core to swell under the influence of ambient humidity is reduced, thus the microporous membrane is not subjected to a pressure in the thickness direction, and its quality can be easily maintained. As a result, variations in battery capacity also can be effectively reduced.

The number of laminations (the number of windings) (times) of the microporous membrane with respect to the winding length (m) of the microporous membrane (overall length of the wound microporous membrane) (the number of laminations/winding length) in the microporous membrane is preferably 2.0 (times/m) or less, more preferably of 1.5 or less, and particularly preferably of 1.0 or less.

When this value is small, the number of laminations of the microporous membrane with respect to the winding length is small, and if this value is 2.0 or less, the constriction due to winding of the microporous membrane can be reduced, and therefore the membrane thickness uniformity of the microporous membrane unwound from the winding can be improved. In addition, as compared with the microporous membrane with the same thickness and winding length, the outer diameter value of the winding becomes relatively large, and therefore R (radius of the outer diameter value of the winding) becomes large, so that frequency of rubbing between microporous membranes can be reduced during winding, which leads to the reduction in static electricity in the winding. A reduced static electricity can reduce the appearance of wrinkles in pulling out the microporous membrane from the microporous membrane winding to prepare a wound battery, and therefore a wound battery property can be improved.

The static electricity of the winding at this time is preferably 1.0 kV or less for the above-stated reason, more preferably 0.6 kV or less, still more preferably 0.4 kV or less, and most preferably 0.2 kV or less.

The core has a maximum backlash, which is measured on a surface plate horizontally installed having a face larger than a side face of the core perpendicular to the rotating shaft, of preferably 0.30 mm or less, more preferably 0.20 mm or less, still more preferably 0.10 mm or less, and most preferably 0.05 mm or less.

This backlash refers to a displacement of the outermost circumference of the core when the core is placed on a surface plate horizontally installed having a face larger than a side face of the core perpendicular to the rotating shaft in such a manner that the side faces of the core perpendicular to the core rotating shaft face upward and downward (one of the side faces perpendicular to the core rotating shaft comes into contact with the surface plate), and a load of 1 kg is applied to any point on the outermost circumference of the core.

The maximum backlash refers to the largest value among the values of backlash that are measured when such measurement is performed with respect to 32 points on the outermost circumference of the two side faces of the core perpendicular to the core rotating shaft (16 points for each face).

If the maximum backlash of 0.30 mm or less, a slight inclination or displacement from a fixed position in fixing the core by pressing its side face against a core alignment face of such as a reeler or a winder can be reduced. Thereby, the appearance of wrinkles or misalignment in winding the microporous membrane around the core, or the generation of hunting motion or fluttering in unwinding the microporous membrane from the winding can be reduced. Such defect reduction leads to decrease in defective rate of products having the wound microporous membrane.

The lower limit of backlash is not limited especially, but a core free from backlash (maximum backlash of 0 mm) can lead to a more remarkable effect.

A method for making the core with a maximum backlash within such a range is not limited especially, and a core with a desired maximum backlash can be obtained by using a mold with high dimension accuracy or by polishing the side face of the core perpendicular to the rotating shaft precisely, for example.

The porosity of the microporous membrane wound around the core is preferably 20% or greater and more preferably 30% or greater from the standpoint of allowing the microporous membrane to follow up the rapid movement of lithium ions, whereas is preferably 90% or less, more preferably 80% or less, and still more preferably 50% or less from the standpoint of the membrane strength and self discharge.

The air permeability of the microporous membrane wound around the core is preferably 1 sec or greater, and more preferably 50 sec or greater from the standpoint of a balance between thickness, porosity and average porous diameter. On the other hand, it is preferably 400 sec or less and more preferably 300 sec or less from the standpoint of permeability.

The tensile strength of the microporous membrane wound around the core is preferably 10 MPa or greater and more preferably 30 MPa or greater in both directions of MD and TD (direction perpendicular to MD, membrane width direction). The tensile strength of 10 MPa or greater is preferred from the standpoint of reducing slit or rupture during winding a battery, from the standpoint of reducing short-circuit caused by foreign matters in the battery, or from the standpoint of reducing pattern transferring from a core with a high surface roughness. The upper limit of the tensile strength is not limited especially, and is preferably 500 MPa or less, more preferably 300 MPa or less and still more preferably 200 MPa or less from the standpoint of relaxing the microporous membrane at an early stage during heat test to weaken the contractile force, resulting in improved safety.

The tensile elastic modulus of the microporous membrane wound around the core is preferably 120 N/cm or less in both directions of MD and TD. If the tensile elastic modulus is 120 N/cm or less, the membrane is not excessively oriented as a separator for lithium-ion secondary battery, and a shutdown material such as polyethylene generate stress relaxation at an early stage when it melts and shrinks during heat test etc. Thereby, shrinking of a separator in a battery can be suppressed, and so that short-circuit between electrodes can be prevented (can improve safety of the separator during heating). The tensile elastic modulus is more preferably 100 N/cm or less, and still more preferably 90 N/cm or less. The lower limit, but not limited to, is preferably 10 N/cm or greater, more preferably 30 N/cm or greater, and still more preferably 50 N/cm or greater. A microporous membrane with such low tensile elastic modulus can be easily achieved by including polyethylene with weight average molecular weight of 500,000 or less in polyolefin making up the microporous membrane.

A microporous membrane with such low tensile elastic modulus has a tendency to form unevenness especially at an innermost portion due to the contraction when it is wound. However, if the winding is prepared in combination with the above-stated core, a microporous membrane winding having both of favorable safety and membrane thickness uniformity can be achieved.

The tensile elastic modulus of the microporous membrane can be adjusted appropriately by adjusting the degree of stretching or by performing relaxing following the stretching as needed, for example.

The thickness of the microporous membrane wound around the core, but not limited to, is preferably 1 µm or greater from the standpoint of membrane strength, and is preferably 500 µm or less and more preferably 100 µm or less from the standpoint of permeability. From the standpoint of the use in a lithium-ion second battery with relatively high capacity in recent years, the thickness is preferably 25 µm or less, more preferably 20 µm or less, still more preferably 16 µm or less and particularly preferably 12 µm or less.

The core of the present embodiment with a specific outer diameter and a specific surface roughness shows more remarkable effects in combination with a thin microporous membrane especially. This may be because influences of the surface roughness of the core increase as a thickness of the microporous membrane with respect to the surface roughness of the core decrease.

The above-mentioned ranges of winding length, porosity, air permeability, tensile strength, tensile elastic modulus, and membrane thickness are preferred from the standpoint achieving a microporous membrane winding capable of providing a microporous membrane with favorable membrane thickness uniformity in combination with the above-stated specific core.

The above-mentioned various properties of the "wound-around microporous membrane" are values determined from the measurement for an outermost layer of the microporous membrane wound around the core.

The microporous membrane may be a single-layer or in a laminated product.

A method for manufacturing a microporous membrane winding according to the present embodiment will be described below. However, the polymer type, the solvent type, the extrusion method, the stretching method, the extraction method, the pore formation method, the heat setting method (called heat treatment as well) and the like are just examples.

Firstly, in a method for manufacturing a microporous membrane winding in the present embodiment, a method for preparing a microporous membrane (manufacturing method for a microporous membrane) is not limited especially. For instance, the method preferably includes a step of melting, kneading and extruding a polymer material and a plasticizer, or a polymer material, a plasticizer and an inorganic agent, a step of stretching; a step of extracting plasticizer (and an inorganic agent as needed); and step of heat setting (called heat treatment as well). Alternatively, the microporous membrane may be manufactured by stretching the film crystallized appropriately to form pores without using a solvent, or by streching a kneaded product of inorganic filler or organic filler and polymer material to form pores in an interface between the polymer and the fillers. Further, an inorganic agent may be coated on the surface of the microporous membrane.

A preferred embodiment of the microporous membrane is prepared by the above-mentioned method.

More specifically, the method for manufacturing a microporous membrane winding may include the following steps of (a) to (e):

(a) a kneading step of kneading a polyolefin composition containing polyolefin, a plasticizer, and an inorganic agent as needed;

(b) a sheet shaping step of extruding the resultant of kneading after the kneading step to shape it into a sheet (this may be single-layer or a laminated product), followed by solidification by cooling;

(c) a stretching step of extracting the plasticizer and the inorganic agent as needed after the sheet shaping step, and further stretching the sheet in at least a monoaxial direction;

(d) a post-processing step of extracting the plasticizer and the inorganic agent as needed after the stretching step, and further performing heat treatment; and (e) a step of slitting the obtained microporous membrane as needed and winding the resultant around a predetermined core.

[(a) Step]

The polyolefin used in the above (a) step includes a homopolymer of ethylene or propylene, or a copolymer formed with at least two monomers selected from the group consisting of ethylene, propylene, 1-butene, 4-methyl-1-pentene, 1-hexene, 1-octene, and norbornene. This may be a mixture thereof.

Comprising polyolefin with weight average molecular weight of 500,000 or less (comprising preferably 40% by mass or greater and more preferably 80% by mass or greater with respect to polyolefin as a whole) is preferable because shrinkage of polymer can be relaxed at an early stage during heat test, for example, and safety can be easily maintained during heat safety test. In the case of using polyolefin with weight average molecular weight of 500,000 or less, however, the microporous membrane obtained has tendency to have a reduced elastic modulus in the thickness direction as compared with the case where polyolefin with weight average molecular weight exceeding 500,000 is used, and thus has a tendency to receive a transferring of unevenness of the core thereon. In this respect, the present inventors have found that using the above-mentioned specific core brings a surprising effect of maintaining safety while suppressing variations in battery quality even when the microporous membrane is composed of polyolefin with weight average molecular weight of 500,000 or less. This effect is more remarkable when polyolefin with weight average molecular weight of 500,000 or less only is used as the polyolefin forming the microporous membrane.

When polyethylene is used as the polyolefin, high-density polyethylene (homopolymer) is preferably used from the standpoint of enabling heat setting at a higher temperature without closing pores. However, low-density polyethylene also may be used. The weight average molecular weight of the microporous membrane as a whole is preferably 100,000 or greater and 1,200,000 or less, and is more preferably 150,000 or greater and 800,000 or less. The weight average molecular weight of 100,000 or greater is preferred, since it gives resistance against membrane rupture during melting to the membrane, and the weight average molecular weight of 1,200,000 or less is preferred, since it facilitates the extruding step, and speeds up the relaxation of a contractile force during melting, thus improves heat resistance of the membrane.

In the above-mentioned (a) step, when a polymer other than polyethylene is blended, the ratio of the polymer other than polyethylene to the total amount of polymer is preferably 1 to 80% by mass, more preferably 2 to 50% by mass, still more preferably 3 to 20% by mass and particularly preferably 5 to 10% by mass. If the ratio of the polymer other than polyethylene is 1% by mass or greater, compressive resistance in the thickness direction improves when the polymer has an elastic modulus higher than that of polyethylene, and heat resistance improves, when the polymer has a melting point higher than that of polyethylene.

If the ratio of the polymer other than polyethylene is 80% by weight or less, it becomes easy to secure the permeability due to uniformity with polyethylene.

Well-known additives can be mixed to the polyolefin composition used in the above-mentioned (a) step, including metal soaps such as calcium stearate and zinc stearate, ultraviolet absorbers, light stabilizers; antistatic agents, anti-fogging agents, coloring pigments and the like.

Examples of the plasticizer may include an organic compound that can form a uniform solution with polyolefin at its boiling point or less. Specific examples include decalin, xylene, dioctyl phthalate, dibutyl phthalate, stearyl alcohol, oleyl alcohol, decyl alcohol, nonyl alcohol, diphenyl ether, n-decane, n-dodecane, and paraffin oil. Among them, paraffin oil and dioctyl phthalate are preferably used, and they may be used in combination of two or more.

The ratio of the plasticizer is not limited especially, and 20% by mass or greater is preferred based on the total mass of polyolefin, plasticizer and an inorganic agent mixed as needed from the standpoint of the porosity of the microporous membrane obtained, and 90% by mass or less is preferred from the standpoint of viscosity during melting and kneading.

Examples of the inorganic agent include oxide ceramics such as alumina, silica (silicon oxide), titania, zirconia, magnesia, ceria, yttria, zinc oxide and iron oxide, nitride ceramics such as silicon nitride, titanium nitride and boron nitride, ceramics such as silicon carbide, calcium carbonate, aluminum sulfate, aluminum hydroxide, potassium titanate, talc, kaolin clay, kaolinite, halloysite, pyrophyllite, montmorillonite, sericite, mica, amesite, bentonite, asbestos, zeolite, calcium silicate, magnesium silicate, diatomaceous earth and silica sand, and glass fibers. They can be used alone or in combination of two or more. From the standpoint of electrochemical stability and improved heat resistance, silica, alumina and titania are preferably used among them.

The melting may be performed in the following manner. First, a part or all of the raw materials are mixed in advance with a Henschel mixer, a ribbon blender, a tumbler blender or the like as needed. Then, all of the raw materials are melted and kneaded with a screw extruder such as single screw extruder or twin screw extruder, a kneader, a mixer or the like. The kneaded resultant is then extruded through a T die or a ring die. At this time, it may be extruded as a single-layer or a laminated product.

Preferably, during kneading, the raw material polymer is mixed with an antioxidant at a predetermined concentration, and then the atmosphere is substituted with nitrogen atmosphere, where the melting and kneading are performed while keeping the nitrogen atmosphere. The melting and kneading are performed preferably at a temperature of 160° C. or greater and more preferably at a temperature of 180° C. or greater. On the other hand, less than 300° C. is preferred and less than 240° C. is more preferred.

[(b) Step]

Examples of method of sheet shaping include solidifying the melt obtained by extrusion after melting and kneading by compression cooling. Examples of the cooling method include a method of bringing the melt into direct contact with a cooling medium such as cool air or cooling water and a method of bringing the melt into contact with a roll or a press cooled with a refrigerant. The latter method of bringing the melt into contact with a roll or press cooled with a refrigerant is preferred because it is excellent in controlling the sheet thickness.

[(c) Step]

Examples of method of sheet stretching include MD monoaxial stretching with a roll stretching machine, TD monoaxial stretching with a tenter, sequential biaxial stretching with a combination of a roll stretching machine and a tenter, sequential biaxial stretching with a combination of a tenter and another tenter, and simultaneous biaxial stretching using a simultaneous biaxial tenter or blown film extrusion. The simultaneous biaxial stretching is preferably used in order to obtain a more uniform film. The total area magnification is preferably 8 times or greater, more preferably 15 times or greater and still more preferably 30 times or greater from the standpoint of a balance between uniformity of membrane thickness, tensile elasticity, porosity and average porous diameter. The total area magnification of 8 times or greater makes it easy to obtain a sheet with high strength and favorable thickness distribution.

The plasticizer or the inorganic agent may be extracted by immersing the membrane in an extraction solvent or showering the membrane with an extraction solvent. The extraction solvent used is preferably a poor solvent for the polyolefin, is a good solvent for the plasticizer and the inorganic agent, and has a boiling point lower than the melting point of the polyolefin. Examples of such an extraction solvent include hydrocarbons such as n-hexane and cyclohexane, halogenated hydrocarbons such as methylene chloride, 1,1,1-trichloroethane and fluorocarbon, alcohols such as ethanol and isopropanol, ketones such as acetone and 2-butanone and alkaline water, which may be used alone or in combination The inorganic agent may be extracted wholly or partially at any step of the entire procedure or it may be left in the product. The order, method and frequency of the extraction are not limited especially. The extraction of the inorganic agent may be omitted as needed.

[(d) Step]

Examples of the heat treatment method include heat setting using a tenter or a roll stretching machine to perform stretching and a relaxation operation. The relaxation operation refers to a contracting operation at a predetermined temperature and relaxation rate in the MD and/or TD of the membrane. The relaxation rate means a value obtained by dividing the MD size of the membrane after the relaxation operation by the MD size of the membrane before the operation, a value obtained by dividing the TD size of the membrane after the relaxation operation by the TD size of the membrane before the operation, or a value obtained by multiplying the relaxation rate of the MD by the relaxation rate of the TD when the membrane is relaxed in both the MD and TD. The predetermined temperature (temperature in the relaxation operation) is preferably 100° C. or greater from the standpoint of thermal shrinkage rate and preferably less than 135° C. from the standpoint of porosity and permeability. The predetermined relaxation rate is preferably 0.9 or less, more preferably 0.8 or less from the standpoint of thermal shrinkage rate. It is, on the other hand, preferably 0.6 or greater from the standpoint of prevention of the appearance of wrinkles, porosity and permeability. The relaxation operation may be performed in both the MD and TD. However, the thermal shrinkage can be reduced not only in the operation direction but also a direction vertical thereto by the relaxation operation in either one of the MD and TD.

[(e) Step]

Any special condition is not imposed on the step of, after the formation of the microporous membrane, winding the microporous membrane around a core (including a slitting step as needed) other than using the core having an outer diameter of 5 inches or greater and an outer surface with a surface roughness of 3.0 µm or less. Herein, preferred embodiments of the core are as stated above.

In addition to the above steps of (a) to (e), the method for manufacturing a microporous membrane winding may include a step of laminating a plurality of single-layers in order to obtain a laminated product. The method further may include a surface treatment step such as exposure to electron beam, exposure to plasma, application of a surfactant, or chemical modification.

The microporous membrane obtained from the microporous membrane winding of the present embodiment has a well-kept thickness distribution as compared with a conventional microporous membrane. Therefore such a microporous membrane is preferably used as a separator for a high-capacity battery especially from the standpoint of obtaining a uniform battery property.

The parameters mentioned above can be measured in accordance with the measurement methods used in Examples described below unless otherwise specified.

EXAMPLES

Next, the present embodiment will be described in more detail by way of Examples and Comparative Examples. The present embodiment is not limited to the Examples below as long as they do not go beyond the gist of the embodiment. The physical properties of the Examples were measured by the methods below.

(1) Weight Average Molecular Weight

A calibration curve was created by performing measurements using standard polystyrene under the following conditions using ALC/GPC 150C type™ produced by Waters Corporation.

Column: two GMH$_6$-HT™+two GMH$_6$-HTL™ produced by Tosoh Corporation,

Mobile phase: o-dichlorobenzene
Detector: differential refractometer
Flow rate: 1.0 ml/min
Column temperature: 140° C.
Sample concentration: 0.1 wt %

(Weight Average Molecular Weight of Polyethylene)

The value for respective molecular weight on the obtained calibration curve were multiplied by 0.43 (Q factor of polyethylene/Q factor of polystyrene=17.7/41.3), whereby a molecular-weight distribution curve was obtained in terms of polyethylene, thus calculating the weight average molecular weight.

(Weight Average Molecular Weight of Polypropylene)

Except for using 0.63 instead of 0.43, the weight average molecular weight of polypropylene was calculated in the same manner as the above.

(Weight Average Molecular Weight of Composition)

Except for using a Q-factor value for a polyolefin that constitutes the largest mass fraction, the weight average molecular weight of a composition was calculated in the same manner as the case of polyethylene.

(2) Membrane Thickness (µm)

The membrane thickness was measured at an ambient temperature of 23±2° C. using a thickness micrometer, KBN™ produced by Toyo Seiki Seisaku-sho, Ltd.

Thicknesses at five points located at substantially regular intervals across the overall width in the TD direction were measured, and an average of them was used as a representative value.

(3) Porosity (%)

A sample of 10 cm by 10 cm square was cut out from a microporous membrane, and its volume (cm$^3$) and mass (g) were measured. These values and the density (g/cm$^3$) were used to calculate the porosity from the formula below:

Porosity (%)=(volume−mass/mixture compound density)/volume×100.

As the mixture compound density, a value calculated from the densities and the mixture ratio of the raw materials used was used.

(4) Air Permeability (sec/100 cm$^3$)

The air permeability was measured with a Gurley densometer, G-B2™ produced by Toyo Seiki Seisaku-sho, Ltd. in accordance with JIS P-8117 (2009).

(5) Tensile Strength (MPa), Tensile Elastic Modulus (N/cm)

MD and TD samples having a width of 10 mm and a length of 100 mm were used to measure these parameters with a tensile tester, Autograph AG-A Type™ produced by Shimadzu Corporation in accordance with JIS K 7127. A distance between chucks was adjusted to 50 mm, and one of the surfaces of each of the end portions (25 mm) of a sample was taped with cellophane tape (N.29, product name; product of Nitto Denko Packing System). In order to prevent slip of the sample during the test, a fluoro rubber having a thickness of 1 mm was applied to the inside of the chuck of the tensile tester. The stretching rate during the test was 200 mm/min.

The tensile strength (MPa) was determined by dividing the strength at rupture by the cross-sectional area of the sample before the test.

The tensile elastic modulus was determined from a gradient of the stress-strain line for a segment where the elongation of the sample is 1 to 4%. More specifically, in the stress-strain curve obtained by plotting a relationship between the tensile strength (MPa) applied to the sample in determining the above mentioned tensile strength and the elongation of the sample (strain) (%), in coordinate with the vertical axis indicating the tensile stress and the horizontal axis indicating the elongation, a gradient of the straight line (straight line portion) between two points of elongation (strain)=1% and 4% was multiplied by the initial thickness of the sample, whereby the tensile elastic modulus (N/cm) was determined.

Herein, the elongation of the sample (%)=(the length after stress applied−the length before stress applied)/the length before stress applied×100.

(6) Outer Surface Roughness, Root Mean Square Value Roughness And Average Length of Roughness Curvilinear Elements (Ra, Rq, Sm) of Core The surface roughness of the outer surface of a core (Ra (arithmetic average roughness), Rq (root mean square value roughness) and Sm (average length of roughness curvilinear elements) were measured with Handysurf E-35A™ produced by Tokyo Seimitsu Co., Ltd. The stylus tip was 90° diamond cone with 5 µmR, and the measurement was performed under the conditions of evaluation length of 5 mm, evaluation speed of 0.6 mm/s, cutoff value of 0.80 mm, and load of 4 mN or less. The measurement was performed for the overall length of the core in the width direction while setting the standard length at 5 mm to determine a minimum value.

(7) Thermal Expansion Coefficient of Core ($K^{-1}$)

A core was left to stand in each of the ovens adjusted at 298 K (25° C.), 313 K (40° C.), 333 K (60° C.) and 353 K (80° C.) for 30 minutes, and immediately after taking them out from the ovens (immediately after means within 30 seconds), the core outer diameter was measured with a dial gauge.

Based on a temperature-expansion rate line, obtained by plotting the measured values in a coordinate with a horizontal axis indicating absolute temperatures and a vertical axis indicating swelling rates ((the length the core after having left to stand at the respective temperature for 30 minutes–the length of the core after having left to stand at 25° C.)/the length of the core after having left to stand at 25° C.), an approximate line was drawn, and the thermal expansion coefficient ($K^{-1}$), which is a gradient of the approximate line and that is a swelling rate per absolute temperature (K), was determined.

In order to determine the outer diameter when the core was left to stand at 25° C., diameters of the side face of the core perpendicular to the rotating shaft at any measurement position (measurement direction) and a position displaced from said measurement position by 90° (measurement direction perpendicular to said measurement direction) were measured, and an average value of them was used. The same points where the measurements of the outer diameter when the core was left to stand at 25° C. were performed were used for measurements of the outer diameters when the core was left to stand at 40° C., 60° C., and 80° C.

(8) Swelling Rate of Core for Humidity (%)

A core was left to stand at a temperature of 25° C. and under relative humidity of 50% for 24 hours, and the core diameter was measured with a dial gauge.

Next, the core was left to stand at a temperature of 25° C. and under relative humidity of 100% for 24 hours, the core diameter was measured in the same way with a dial gauge, and the swelling rate was calculated by the formula below:

Swelling rate (%)=(Core outer diameter under relative humidity of 100%–Core outer diameter under relative humidity of 50%)/(Core outer diameter under relative humidity of 50%)×100.

The outer diameter was determined in the same manner as (7).

(9) Backlash of Core

As illustrated in FIG. 1, a core (a) was placed on a surface plate (b) made of granite that is horizontally installed in such a manner that side faces of the core perpendicular to the core rotating shaft face upward and downward (so that one of the side faces perpendicular to the core rotating shaft comes into contact with the surface plate), and a dial gauge (c) produced by Ozaki MFG. Co., LTD, 107-HG™ was set at any position of 2 mm inside from the outermost circumference of the core, and a point where a gauge head and the core just come into contact was set as a reference point. Then, a displacement of the dial gauge when load of 1 kg was applied to a position on the outermost circumference of the core that is point-symmetrical position to the reference point with respect to the center of the outermost circumference was determined as the backlash.

Herein, the gauge head used was a needle gauge head produced by Ozaki MFG. Co., LTD, XB-800™. The measurement was performed at 16 points for each of the both side faces of the core on the outermost circumference at intervals of about 22.5° as the central angle, and the maximum value among the obtained backlash values was determined as the maximum backlash of the core.

(10) The Number of Laminations/Winding Length

The number of laminations (times) of a microporous membrane winding was measured, and the measured value was divided by the winding length of the wound microporous membrane.

(11) Static Electricity (kV)

Static electricity of the outermost layer of the winding immediately after winding of the microporous membrane (immediately after means within 30 seconds) was measured with ASPURE static meter produced by ASONE Corporation: YC102™.

(12) Battery Capacity Variation (%), Battery Heat Stability (min.), and Battery Winding Property Evaluation a. Preparation of Positive Electrode 92.2% by mass of lithium-cobalt composite oxide $LiCoO_2$ as a positive electrode active material, 2.3% by mass each of flake graphite and acetylene black as electrically conductive agents, and 3.2% by mass of polyvinylidene fluoride (PVDF) as a binder were dispersed in N-methylpyrrolidone (NMP) to prepare a slurry. This slurry was applied onto one side of a 20 μm-thick aluminum foil serving as a positive electrode collector using a die coater, was dried at 130° C. for 3 minutes, and was compression-molded with a roll press. At this time, coating was performed so that the amount of positive electrode active material applied was 250 $g/m^2$ and the bulk density of the active material was 3.00 $g/cm^3$.

b. Preparation of Negative Electrode 96.9% by mass of artificial graphite as a negative electrode active material, 1.4% by mass of ammonium salt of carboxymethylcellulose and 1.7% by mass of styrene-butadiene copolymer latex as binders were dispersed in purified water to prepare slurry. This slurry was applied onto one side of a 12 μm-thick copper foil serving as a negative electrode collector using a die coater, was dried at 120° C. for 3 minutes, and was compression-molded with a roll press. At this time, the amount of negative electrode active material applied was 106 $g/m^2$, and the bulk density of the active material was 1.35 $g/cm^3$.

c. Preparation of Nonaqueous Electrolyte Solution $LiPF_6$ as a solute was dissolved in a mixed solvent of ethylene carbonate and ethyl methyl carbonate at a mixing ratio of 1 to 2 (v/v) so that the concentration was 1.0 mol/L, to prepare a nonaqueous electrolyte solution.

d. Battery Assembly

A separator was cut into a circle of 18 mmφ and a positive electrode and a negative electrode were cut into a circle of 16 mmφ, and they were stacked in the order of the positive electrode, the separator, and the negative electrode so that the active materials of the positive electrode and the negative electrode face each other, which then was put in a stainless-steel metal container with a lid. The container and the lid are insulated from each other, where the container was in contact with the copper foil as the negative electrode and the lid was in contact with the aluminum foil as the positive electrode. This container was filled with the above-mentioned nonaqueous electrolyte solution, and was hermetically sealed. After leaving to stand at a room temperature for one day, the battery was charged at a current value of 3 mA (0.5 C) under the ambient of 25° C. up to the battery voltage of 4.2 V, and after reaching the voltage, reduction of the current was started from 3 mA while keeping the voltage at 4.2 V, thus performing the initial charging for 6 hours in total after the preparation of the battery. Subsequently, the voltage was discharged at the current value of 3 mA (0.5 C) to the battery voltage of 3.0 V.

e. Battery Capacity Variation (%)

A battery was charged at a current value of 6 mA (1.0 C) under the ambient of 25° C. up to the battery voltage of 4.2 V, and after reaching the voltage, reduction of the current was started from 6 mA while keeping the voltage at 4.2 V, thus performing charging for 3 hours in total. Subsequently, the voltage was discharged at the current value of 6 mA (1.0 C) to the battery voltage of 3.0 V. The voltage capacity in this state was measured. This operation was performed for 100 cells of batteries in total, and the percentage of cells with variations of ±5% or greater from the average capacity of the 100 cells was calculated, to obtain a battery capacity variation.

Battery capacity variation (%)={the number of cells with a variation beyond ±5% of the average capacity/100}×100 (%).

f. Battery Heat Safety (min.)

The cells with a variation within ±5% of the average capacity in the step e (cells free from variations) was heated from a room temperature to 150° C. at a rate of temperature increase of 5° C./min. After reaching 150° C., the temperature was maintained at 150° C., and a time period before the cells generate heat due to short-circuit was measured. The heat generation was observed with a thermocouple connected with a cell, and a time period required until the temperature reaches 155° C. or greater was measured.

g. Battery Winding Property Evaluation

The mold obtained in the above step a was slit into the width of 57.0 mm to obtain a positive electrode.

The mold obtained in the above step b was slit into the width of 58.5 mm to obtain a negative electrode.

The positive electrode, a microporous membrane unwound from a microporous membrane winding of Examples and Comparative examples, the negative electrode and said microporous membrane were stacked in this order, and then a wound electrode body was manufactured in a conventional manner. Herein, the number of windings was adjusted depending on the thickness of the microporous membrane. An outermost end of the obtained wound electrode body was fixed by taping with insulation tape. A negative electrode lead was welded to a battery can, and a positive electrode lead was welded to a safety valve, and the wound electrode body was placed in the battery can.

This operation was repeated 100 times, and the number of wound electrode bodies having a winding defect of misalignment or wrinkles of the microporous membrane generated in placing a wound electrode body in the battery can was counted, and the battery winding property evaluation (%) was obtained by the formula below:

Battery winding property evaluation (%)=100−winding defect rate (%).

Example 1

99% by mass of polyethylene homopolymer (PE(A)) with weight average molecular weight of 1,000,000 and 1% by mass of pentaerythrityl-tetrakis-[3-(3,5-di-t-butyl-4-hydroxyphenyl)propionate] as an antioxidant were dry blended again with a tumbler blender, to obtain a polymer-containing mixture. After the atmosphere was substituted with nitrogen, the polymer-containing mixture thus obtained was supplied to a twin-screw extruder in a nitrogen atmosphere using a feeder. Liquid paraffin (with kinematic viscosity of $7.59 \times 10^{-5}$ m$^2$/s at 37.78° C.) was injected into the cylinder of the extruder via a plunger pump.

The feeder and the pump were adjusted so that a liquid paraffin amount ratio in the total mixture to be extruded after melting and kneading became 65% by mass (i.e., the polymer concentration became 35% by mass). The melting and kneading were performed under the conditions of a preset temperature of 200° C., a screw rotation rate of 240 rpm, and a discharge rate of 12 kg/h.

The kneaded melt was then extruded and cast through a T-die onto a cooling roll controlled to a surface temperature of 25° C., whereby a gel sheet with an original membrane thickness of 1,400 µm was obtained.

The gel sheet was then introduced into a simultaneous biaxial tenter stretching machine and biaxially stretched. The stretching was performed under the conditions of an MD draw magnification of 7.0, a TD draw magnification of 7.0 (i.e., 7×7 times) and a biaxial stretching temperature of 125° C.

The resulting gel sheet was then introduced into a methyl ethyl ketone tank, and was immersed completely in methyl ethyl ketone to remove the liquid paraffin by extraction. Thereafter, the methyl ethyl ketone was removed by drying.

The sheet was then introduced to a TD tenter for heat setting (this may be abbreviated as "HS"). HS was performed at a heat setting temperature of 125° C. and of the stretch magnification of 1.2 times, followed by relaxation operation of 0.8 times (i.e., HS relaxation ratio of 0.8 times).

Thereafter, the obtained microporous membrane underwent slit processing into the width of 60 mm and the length of 50 m, and was wound around a core of 65 mm in width (manufactured by coating the surface of a paper core with acrylic resin, attaching a cutting blade to the surface of the core while rotating the core, and sweeping the surface in the width direction to cut the surface for smoothing. After smoothing, the outer diameter of the core was 5 inches. Further, side faces of the core perpendicular to the rotating shaft were polished with a surface polisher for smoothing), thus obtaining a microporous membrane winding.

For a microporous membrane unwound from the winding, physical properties, battery capacity variations, and battery heat safety were evaluated. In the battery capacity variation evaluation, 100 points located at intervals of 50 cm in the lengthwise direction of the winding with winding length of 50 m were used. Table 1 shows the result.

Example 2

In the same manner as in Example 1 except that a core used had the properties shown in Table 1, a microporous membrane and a microporous membrane winding were manufactured.

The outer diameter of the core was adjusted by adjusting the thickness of a resin coat layer and the amount of cutting.

Example 3

In the same manner as in Example 2 except that the microporous membrane subjected to heat setting and relaxation operation was further shrunk by 2% at a temperature of 100° C. with a tenter in both of MD and TD directions to relax the MD and TD tensile elastic moduli, a microporous membrane and a microporous membrane winding were manufactured.

Example 4

In the same manner as in Example 3 except that a mixture of 50 parts by mass of PE(A) and 50 parts by mass of polyethylene homopolymer (PE(B)) with weight average molecular weight of 300,000 were used instead of the polyethylene homopolymer (PE(A)) with weight average molecular weight of 1,000,000, a microporous membrane and a microporous membrane winding were manufactured.

Example 5

In the same manner as in Example 2 except that PE(B) was used instead of PE(A), a microporous membrane and a microporous membrane winding were manufactured.

Example 6

In the same manner as in Example 5 except that the same shrinking process as in Example 3 was performed, a microporous membrane and a microporous membrane winding were manufactured.

Example 7

In the same manner as in Example 5 except that a core used was changed to that with the properties shown in Table 1 and the microporous membrane subjected to heat setting and relaxation operation was further stretched by 2% at a temperature of 100° C. with a tenter in both of MD and TD directions so as to adjust the tensile elastic modulus, a microporous membrane winding was manufactured.

The properties of the core outer surface were adjusted by adjusting the amount of cutting.

Examples 8 to 10

In the same manner as in Example 7 except that a core used had the properties shown in Table 1, a microporous membrane and a microporous membrane winding were manufactured.

As the core, a core made of acrylonitrile-butadiene-styrene copolymer (ABS resin) was prepared, a cutting blade was attached to the surface of the core while rotating the core, and the surface of the core was swept in the width direction to cut the surface for smoothing. The outer diameter of the core was adjusted by adjusting the outer diameter of the prepared core made of ABS resin, and the properties of the outer surface of the core were adjusted by adjusting the cutting amount. Further, side faces of the core perpendicular to the rotating shaft were polished with a surface polisher for smoothing.

Example 11

In the same manner as in Example 10 except that an original membrane thickness was changed to 900 μm, a microporous membrane and a microporous membrane winding were manufactured.

Example 12

In the same manner as in Example 11 except that the microporous membrane subjected to heat setting and relaxation operation was further shrunk by 2% at a temperature of 100° C. with a tenter in both of MD and TD directions to relax the MD and TD elastic tensile moduli, a microporous membrane and a microporous membrane winding were manufactured.

Example 13

In the same manner as in Example 12 except that a mixture of 95 parts by mass of PE(B) and 5 parts by mass of polypropylene homopolymer (PP) with weight average molecular weight of 300,000 were used instead of PE(B), a microporous membrane and a microporous membrane winding were manufactured.

Examples 14 to 20, 27

In the same manner as in Example 13 except that a core used was changed to that with the properties shown in Table 2, a microporous membrane and a microporous membrane winding were manufactured.

Examples 21, 22

In the same manner as in Example 13 except that a core used was changed to that with the properties shown in Table 2, a microporous membrane and a microporous membrane winding were manufactured.

The thermal expansion coefficient of the core was adjusted by changing the copolymerization ratio of acrylonitrile, butadiene and styrene of the ABS resin as core raw materials.

Examples 23 to 25

In the same manner as in Example 13 except that a core used was changed to that with the properties shown in Table 2, a microporous membrane and a microporous membrane winding were manufactured.

As the core, a core made of Bakelite was prepared, a cutting blade was attached to the surface of the core while rotating the core, and the surface of the core was swept in the width direction to cut the surface for smoothing. Further, side faces of the core perpendicular to the rotating shaft were polished with a surface polisher for smoothing.

The swelling rate of the core was adjusted by leaving the core to stand at a high temperature for aging. In Example 25, the side faces of the core perpendicular to the rotating shaft were not polished with a surface polisher.

Example 26

In the same manner as in Example 24 except that the width of the microporous membrane was slit into 150 mm, and was wound around a core of 155 m in width, and a positive electrode slit into 147 mm and a negative electrode slit into 148.5 mm were used in the battery winding property evaluation, a microporous membrane and a microporous membrane winding were manufactured.

Comparative Examples 1 to 4, 6

In the same manner as in Example 7 except that a core used was changed to that with the properties shown in Table 3, a microporous membrane and a microporous membrane winding were manufactured.

As for the cores in Comparative Examples 1 and 2, surface cutting was not performed after coating with resin.

As for the core in Comparative Example 6, surface cutting was not performed.

Comparative Example 5

In the same manner as in Example 11 except that a core used was changed to that with the properties shown in Table 3, a microporous membrane winding was manufactured.

Comparative Example 7

In the same manner as in Example 26 except that a core used was changed to that with the properties shown in Table 3 and polyolefin used was changed to that shown in Table 3, a microporous membrane and a microporous membrane winding were manufactured.

With respect to the microporous membrane unwound from the above-stated microporous membrane windings in Examples 1 to 27 and Comparative Examples 1 to 7, physical properties, battery capacity variations, battery heat safety, battery winding properties, and static electricity were evaluated. Tables 1 to 3 show the result.

TABLE 1

|  |  | Example |  |  |  |  |  |  |
|---|---|---|---|---|---|---|---|---|
|  |  | 1 | 2 | 3 | 4 | 5 | 6 | 7 |
| microporous membrane raw material | PE(A) with Mw of 1,000,000 (parts by mass) | 100 |  |  | 50 |  | 0 |  |
|  | PE(B) with Mw of 300,000 (parts by mass) |  | 0 |  | 50 |  | 100 |  |
|  | PP with Mw of 300,000 (parts by mass) |  |  |  | 0 |  |  |  |
| microporous membrane physical properties at outermost layer of microporous membrane winding | thickness (μm) |  |  |  | 14 |  |  |  |
|  | porosity (%) |  |  |  | 40 |  |  |  |
|  | air permeability (sec/100 cm$^3$) |  |  |  | 200 |  |  |  |
|  | MD tensile strength (MPa) |  |  |  | 140 |  |  |  |
|  | MD tensile strength (MPa) |  |  |  | 130 |  |  |  |
|  | MD tensile elastic modulus (N/cm) | 140 |  | 115 | 105 | 95 | 80 | 115 |
|  | TD tensile elastic modulus (N/cm) | 130 |  | 110 | 100 | 80 | 60 | 110 |
| static electricity at outermost layer of microporous membrane winding (kV) |  | 0.9 | 0.7 | 0.7 | 0.7 | 0.7 | 0.7 | 0.5 |
| core properties | core outer diameter (inch) | 5 |  |  | 6 |  |  | 8 |
|  | core material |  |  |  | Paper |  |  |  |
|  | core outer surface arithmetic average roughness Ra (μm) | 2.6 | 2.6 | 2.6 | 2.6 | 2.6 | 2.6 | 1.8 |
|  | core outer surface root mean square value roughness Rq (μm) | 2.8 | 2.8 | 2.7 | 2.4 | 2.8 | 2.5 | 1.9 |
|  | core outer surface average length of roughness curvilinear elements Sm (μm) | 225 | 225 | 225 | 225 | 225 | 225 | 190 |
|  | core thermal expansion coefficient (×10$^{-6}$/K) |  |  |  | −85 |  |  |  |
|  | core swelling rate (%) | 0.082 | 0.081 | 0.079 | 0.082 | 0.080 | 0.078 | 0.083 |
|  | number of laminations (times)/winding length (m) | 2.50 | 2.08 | 2.08 | 2.08 | 2.08 | 2.08 | 1.58 |
|  | core backlash | 0.08 | 0.07 | 0.08 | 0.08 | 0.07 | 0.07 | 0.06 |
| microporous membrane physical properties at innermost layer of microporous membrane winding | thickness difference between outermost layer and innermost layer of winding | 1.50 | 1.10 | 1.30 | 1.30 | 1.40 | 1.40 | 0.90 |
|  | porosity of microporous membrane at innermost layer of winding (%) | 32 | 35 | 34 | 34 | 33 | 33 | 36 |
|  | air permeability of microporous membrane at innermost layer of winding (sec/100 cm$^3$) | 270 | 240 | 250 | 250 | 260 | 260 | 230 |
| battery evaluation | battery capacity variation (%) | 9 | 5 | 6 | 6 | 5 | 6 | 3 |
|  | battery heat safety (min.) | 13 | 13 | 18 | 25 | 33 | 42 | 30 |
|  | battery winding property (%) | 91 | 93 | 93 | 92 | 93 | 93 | 95 |

|  |  | Example |  |  |  |  |
|---|---|---|---|---|---|---|
|  |  | 8 | 9 | 10 | 11 | 12 |
| microporous membrane raw material | PE(A) with Mw of 1,000,000 (parts by mass) |  |  | 0 |  |  |
|  | PE(B) with Mw of 300,000 (parts by mass) |  |  | 100 |  |  |
|  | PP with Mw of 300,000 (parts by mass) |  |  | 0 |  |  |
| microporous membrane physical properties at outermost layer of microporous membrane winding | thickness (μm) |  |  | 14 |  | 9 |
|  | porosity (%) |  |  | 40 |  |  |
|  | air permeability (sec/100 cm$^3$) |  | 200 |  | 130 |  |
|  | MD tensile strength (MPa) |  |  | 140 |  |  |
|  | MD tensile strength (MPa) |  |  | 130 |  |  |
|  | MD tensile elastic modulus (N/cm) |  |  | 115 |  | 90 |
|  | TD tensile elastic modulus (N/cm) |  |  | 110 |  | 80 |
| static electricity at outermost layer of microporous membrane winding (kV) |  | 0.5 | 0.5 | 0.5 | 0.5 | 0.5 |
| core properties | core outer diameter (inch) |  |  | 8 |  |  |
|  | core material |  |  | ABS |  |  |
|  | core outer surface arithmetic average roughness Ra (μm) | 0.9 | 0.4 | 0.2 | 0.2 | 0.2 |

TABLE 1-continued

| | | | | | | |
|---|---|---|---|---|---|---|
| | core outer surface root mean square value roughness Rq (μm) | 1.0 | 0.5 | 0.3 | 0.2 | 0.3 |
| | core outer surface average length of roughness curvilinear elements Sm (μm) | 190 | 160 | 145 | 145 | 145 |
| | core thermal expansion coefficient (×10$^{-6}$/K) | | | 90 | | |
| | core swelling rate (%) | 0.032 | 0.031 | 0.033 | 0.033 | 0.032 |
| | number of laminations (times)/ winding length (m) | 1.58 | 1.58 | 1.58 | 1.59 | 1.59 |
| | core backlash | 0.05 | 0.04 | 0.03 | 0.03 | 0.03 |
| microporous membrane physical properties at innermost layer of microporous membrane winding | thickness difference between outermost layer and innermost layer of winding | 0.40 | 0.20 | 0.10 | 0.10 | 0.20 |
| | porosity of microporous membrane at innermost layer of winding (%) | 38 | 39 | 40 | 40 | 39 |
| | air permeability of microporous membrane at innermost layer of winding (sec/100 cm$^3$) | 215 | 210 | 200 | 130 | 130 |
| battery evaluation | battery capacity variation (%) | 2 | 1 | 0 | 3 | 4 |
| | battery heat safety (min.) | 31 | 32 | 31 | 29 | 38 |
| | battery winding property (%) | 95 | 95 | 94 | 94 | 94 |

TABLE 2

| | | Example | | | | | | | |
|---|---|---|---|---|---|---|---|---|---|
| | | 13 | 14 | 15 | 16 | 17 | 18 | 19 | 20 |
| microporous membrane raw material | PE(A) with Mw of 1,000,000 (parts by mass) | | | | 0 | | | | |
| | PE(B) with Mw of 300,000 (parts by mass) | | | | 95 | | | | |
| | PP with Mw of 300,000 (parts by mass) | | | | 5 | | | | |
| microporous membrane physical properties at outermost layer of microporous membrane winding | thickness (μm) | | | | 9 | | | | |
| | porosity (%) | | | | 40 | | | | |
| | air permeability (sec/100 cm$^3$) | | | | 130 | | | | |
| | MD tensile strength (MPa) | | | | 140 | | | | |
| | MD tensile strength (MPa) | | | | 130 | | | | |
| | MD tensile elastic modulus (N/cm) | | | | 90 | | | | |
| | TD tensile elastic modulus (N/cm) | | | | 80 | | | | |
| static electricity at outermost layer of microporous membrane winding (kV) | | 0.5 | 0.3 | 0.2 | 0.2 | 0.2 | 0.2 | 0.2 | 0.2 |
| core properties | core outer diameter (inch) | 8 | 9 | | | 10 | | | |
| | core material | | | | ABS | | | | |
| | core outer surface arithmetic average roughness Ra (μm) | | | | 0.2 | | | | |
| | core outer surface root mean square value roughness Rq (μm) | 0.2 | 0.2 | 1.6 | 1.1 | 1.1 | 1.1 | 1.1 | 0.2 |
| | core outer surface average length of roughness curvilinear elements Sm (μm) | 145 | 90 | 90 | 90 | 220 | 280 | 320 | 90 |
| | core thermal expansion coefficient (×10$^{-6}$/K) | | | | 90 | | | | |
| | core swelling rate (%) | 0.031 | 0.031 | 0.030 | 0.035 | 0.034 | 0.031 | 0.032 | 0.032 |
| | number of laminations (times)/ winding length (m) | 1.59 | 1.41 | 1.25 | 1.25 | 1.25 | 1.25 | 1.25 | 1.25 |
| | core backlash | 0.04 | 0.03 | 0.04 | 0.02 | 0.04 | 0.05 | 0.04 | 0.03 |
| microporous membrane physical properties at innermost layer of microporous membrane winding | thickness difference between outermost layer and innermost layer of winding | 0.20 | 0.15 | 0.70 | 0.40 | 0.60 | 0.80 | 1.20 | 0.10 |
| | porosity of microporous membrane at innermost layer of winding (%) | 39 | 39 | 34 | 38 | 35 | 33 | 31 | 40 |
| | air permeability of microporous membrane at innermost layer of winding (sec/100 cm$^3$) | 130 | 130 | 170 | 140 | 160 | 170 | 190 | 130 |
| battery evaluation | battery capacity variation (%) | 4 | 3 | 7 | 4 | 7 | 8 | 9 | 2 |
| | battery heat safety (min.) | 47 | 47 | 47 | 47 | 44 | 46 | 45 | 47 |
| | battery winding property (%) | 95 | 96 | 99 | 99 | 97 | 98 | 99 | 98 |

TABLE 2-continued

| | | Example | | | | | | |
|---|---|---|---|---|---|---|---|---|
| | | 21 | 22 | 23 | 24 | 25 | 26 | 27 |
| microporous membrane raw material | PE(A) with Mw of 1,000,000 (parts by mass) | | | | 0 | | | |
| | PE(B) with Mw of 300,000 (parts by mass) | | | | 95 | | | |
| | PP with Mw of 300,000 (parts by mass) | | | | 5 | | | |
| microporous membrane physical properties at outermost layer of microporous membrane winding | thickness (μm) | | | | 9 | | | |
| | porosity (%) | | | | 40 | | | |
| | air permeability (sec/100 cm³) | | | | 130 | | | |
| | MD tensile strength (MPa) | | | | 140 | | | |
| | MD tensile strength (MPa) | | | | 130 | | | |
| | MD tensile elastic modulus (N/cm) | | | | 90 | | | |
| | TD tensile elastic modulus (N/cm) | | | | 80 | | | |
| | static electricity at outermost layer of microporous membrane winding (kV) | 0.2 | 0.2 | 0.2 | 0.2 | 0.2 | 0.2 | 0 |
| core properties | core outer diameter (inch) | | | | 10 | | | 15 |
| | core material | | ABS | | | Bakelite | | ABS |
| | core outer surface arithmetic average roughness Ra (μm) | | | | 0.2 | | | |
| | core outer surface root mean square value roughness Rq (μm) | 0.2 | 0.2 | 0.2 | 0.2 | 0.2 | 0.2 | 0.2 |
| | core outer surface average length of roughness curvilinear elements Sm (μm) | 90 | 90 | 90 | 90 | 90 | 90 | 90 |
| | core thermal expansion coefficient (×10⁻⁶/K) | 120 | 160 | 45 | 45 | 45 | 45 | 90 |
| | core swelling rate (%) | 0.035 | 0.030 | 0.031 | 0.020 | 0.020 | 0.020 | 0.031 |
| | number of laminations (times)/winding length (m) | 1.25 | 1.25 | 1.25 | 1.25 | 1.25 | 1.25 | 0.84 |
| | core backlash | 0.04 | 0.03 | 0.05 | 0.04 | 0.32 | 0.04 | 0.03 |
| microporous membrane physical properties at innermost layer of microporous membrane winding | thickness difference between outermost layer and innermost layer of winding | 0.20 | 0.50 | 0.10 | 0.00 | 0.00 | 0.00 | 0.00 |
| | porosity of microporous membrane at innermost layer of winding (%) | 39 | 36 | 40 | 40 | 40 | 40 | 40 |
| | air permeability of microporous membrane at innermost layer of winding (sec/100 cm³) | 130 | 150 | 130 | 130 | 130 | 130 | 130 |
| battery evaluation | battery capacity variation (%) | 4 | 7 | 1 | 0 | 0 | 0 | 1 |
| | battery heat safety (min.) | 44 | 45 | 46 | 46 | 47 | 47 | 46 |
| | battery winding property (%) | 98 | 98 | 99 | 98 | 92 | 96 | 100 |

TABLE 3

| | | Comparative Example | | | | | | |
|---|---|---|---|---|---|---|---|---|
| | | 1 | 2 | 3 | 4 | 5 | 6 | 7 |
| microporous membrane raw material | PE(A) with Mw of 1,000,000 (parts by mass) | | | | 0 | | | |
| | PE(B) with Mw of 300,000 (parts by mass) | | | | 100 | | | |
| | PP with Mw of 300,000 (parts by mass) | | | | 0 | | | |
| microporous membrane physical properties at outermost layer of microporous membrane winding | thickness (μm) | | | 14 | | 9 | 14 | 9 |
| | porosity (%) | | | | 40 | | | |
| | air permeability (sec/100 cm³) | | | 200 | | 130 | 200 | 130 |
| | MD tensile strength (MPa) | | | | 140 | | | |
| | MD tensile strength (MPa) | | | | 130 | | | |
| | MD tensile elastic modulus (N/cm) | | | | 115 | | | 90 |
| | TD tensile elastic modulus (N/cm) | | | | 110 | | | 80 |
| | static electricity at outermost layer of microporous membrane winding (kV) | 0.4 | 1.2 | 1.2 | 1.2 | 1.2 | 0.5 | 1.2 |
| core properties | core outer diameter (inch) | 8 | | | 4 | | 8 | 4 |
| | core material | | Paper | | | ABS | | |
| | core outer surface arithmetic average roughness Ra (μm) | 3.6 | 3.6 | 1.4 | 0.3 | 0.3 | 3.6 | 0.2 |

TABLE 3-continued

| | | Comparative Example | | | | | | |
|---|---|---|---|---|---|---|---|---|
| | | 1 | 2 | 3 | 4 | 5 | 6 | 7 |
| | core outer surface root mean square value roughness Rq (μm) | 3.8 | 3.6 | 1.5 | 0.4 | 0.3 | 3.8 | 0.3 |
| | core outer surface average length of roughness curvilinear elements Sm (μm) | 225 | 225 | 145 | 145 | 145 | 225 | 145 |
| | core thermal expansion coefficient (×10⁻⁶/K) | −85 | −85 | | | 90 | | |
| | core swelling rate (%) | 0.081 | 0.083 | 0.032 | 0.031 | 0.030 | 0.032 | 0.032 |
| | number of laminations (times)/ winding length (m) | 1.58 | 3.12 | 3.12 | 3.12 | 3.14 | 1.58 | 3.14 |
| | core backlash | 0.08 | 0.09 | 0.05 | 0.06 | 0.05 | 0.03 | 0.05 |
| microporous membrane physical properties at innermost layer of microporous membrane winding | thickness difference between outermost layer and innermost layer of winding | 2.60 | 2.90 | 2.60 | 2.40 | 1.90 | 2.50 | 1.90 |
| | porosity of microporous membrane at innermost layer of winding (%) | 26 | 24 | 26 | 28 | 24 | 27 | 24 |
| | air permeability of microporous membrane at innermost layer of winding (sec/100 cm³) | 340 | 360 | 340 | 320 | 220 | 340 | 220 |
| battery evaluation | battery capacity variation (%) | 14 | 17 | 14 | 11 | 13 | 11 | 12 |
| | battery heat safety (min.) | 31 | 31 | 32 | 31 | 29 | 30 | 29 |
| | battery winding property (%) | 98 | 89 | 88 | 89 | 90 | 98 | 82 |

A microporous membrane obtained from a microporous membrane winding of the present invention is favorably used as a separator for a high-capacity lithium-ion secondary battery using a particularly thin membrane

The invention claimed is:

1. A microporous membrane winding comprising a core of cylindrical shape and a microporous membrane comprised of polyolefin wound around the core having outermost layer and an innermost layer, wherein the core has an outer diameter of 5 inches or greater, and 20 inches or less and a surface roughness of the core is 3.0 μm or less and 0.01 μm or greater, and wherein the thickness of the outermost layer differs from the thickness of the innermost layer by a factor of 1.5 or less.

2. The microporous membrane winding according to claim 1, wherein the outer surface of the core has a root mean square value roughness of 3.0 μm or less.

3. The microporous membrane winding according to claim 1 or 2, wherein the outer surface of the core has an average length of curvilinear elements of 300 μm or less.

4. The microporous membrane winding according to claim 1 or 2, wherein the core has an absolute value of a thermal expansion coefficient of 150×10⁻⁶/K or less.

5. The microporous membrane winding according to claim 1 or 2, wherein the core has a swelling rate of 0.06% or less.

6. The microporous membrane winding according to claim 1 or 2, wherein a value obtained by dividing the number of laminations (times) of the microporous membrane winding by its winding length (m) is 2.0 or less.

7. The microporous membrane winding according to claim 1 or 2, wherein the core has a maximum backlash of 0.30 mm or less, the maximum backlash being measured on a surface plate horizontally installed having a face larger than a side face of the core perpendicular to a rotating shaft thereof.

8. The microporous membrane winding according to claim 1 or 2, wherein both of a MD tensile elastic modulus and a TD tensile elastic modulus of the microporous membrane are in the range of from 10 to 120 N/cm.

9. The microporous membrane winding according to claim 1 or 2, wherein the core has an outer diameter in the range of from 5 to 15 inches.

10. The microporous membrane winding according to claim 1 or 2, wherein the microporous membrane is comprised of polyolefin, the polyolefin comprising at least polyethylene with weight average molecular weight of 500,000 or less.

11. The microporous membrane winding according to claim 1 or 2, wherein the microporous membrane is comprised of polyethylene with weight average molecular weight of 500,000 or less.

12. A lithium-ion secondary battery comprising a microporous membrane obtained from the microporous membrane winding according to claim 1 or 2.

13. A method for manufacturing the microporous membrane winding according to claim 1, comprising the steps of:
preparing a core with an outer diameter of 5 inches or greater and 20 inches or less and with an outer surface having a surface roughness of 3.0 μm or less and 0.01 μm or greater;
preparing a microporous membrane comprised of polyolefin; and
winding the microporous membrane around the core.

14. The method for manufacturing a microporous membrane winding according to claim 13, wherein the outer surface of the core has a root mean square value roughness of 3.0 μm or less.

15. The method for manufacturing a microporous membrane winding according to claim 13 or 14, wherein the outer surface of the core has an average length of curvilinear elements of 300 μm or less.

16. The method for manufacturing a microporous membrane winding according to claim 13 or 14, wherein the core has an absolute value of a thermal expansion coefficient of 150×10⁻⁶/K or less.

17. The method for manufacturing a microporous membrane winding according to claim 13 or 14, wherein the core has a swelling rate of 0.06% or less.

18. The method for manufacturing a microporous membrane winding according to claim 13 or 14, wherein a value obtained by dividing the number of laminations (times) of the microporous membrane winding by its winding length (m) is 2.0 or less.

19. The method for manufacturing a microporous membrane winding according to claim 13 or 14, wherein the core has a maximum backlash of 0.30 mm or less, the maximum backlash being measured on a surface plate horizontally installed having a face larger than a side face of the core perpendicular to a rotating shaft thereof.

20. The method for manufacturing a microporous membrane winding according to claim 13 or 14, wherein both of a MD tensile modulus and a TD tensile modulus of the microporous membrane are in the range of from 10 to 120 N/cm.

21. The method for manufacturing a microporous membrane winding according to claim 13 or 14, wherein the core has an outer diameter in the range of from 5 to 15 inches.

22. The method for manufacturing a microporous membrane winding according to claim 13 or 14, wherein the microporous membrane is comprised of polyolefin comprising at least polyethylene with weight average molecular weight of 500,000 or less.

23. The method for manufacturing a microporous membrane winding according to claim 13 or 14, wherein the microporous membrane is comprised of polyethylene with weight average molecular weight of 500,000 or less.

24. A microporous membrane winding according to claim 1 having a battery capacity variation of 9 or less.

* * * * *